US006109122A

United States Patent [19]

Bori et al.

[11] Patent Number: 6,109,122

[45] Date of Patent: Aug. 29, 2000

[54] STARTER MOTOR ASSEMBLY

[75] Inventors: Laszlo Bori, Dea'k; Attila Lepres, Eōtiōs, both of Hungary

[73] Assignee: Delco Remy International, Inc., Anderson, Ind.

[21] Appl. No.: 09/189,632

[22] Filed: Nov. 10, 1998

[51] Int. Cl.[7] .............................. F02N 15/06; F16H 1/28

[52] U.S. Cl. ............................... 74/7 E; 74/7 A; 74/7 C; 188/82.2; 188/82.84; 192/42; 192/44; 475/318

[58] Field of Search ........................ 74/7 E, 7 C; 192/42, 192/44; 188/82.2, 82.84; 475/318

[56] References Cited

U.S. PATENT DOCUMENTS

| | | | |
|---|---|---|---|
| 455,549 | 7/1891 | Sternoff-beyer | 192/44 |
| 1,282,172 | 10/1918 | Beirns . | |
| 4,305,002 | 12/1981 | Mortensen . | |
| 4,528,470 | 7/1985 | Young et al. . | |
| 4,760,274 | 7/1988 | Isozumi . | |
| 4,777,836 | 10/1988 | Giometti . | |
| 4,785,679 | 11/1988 | Weber et al. . | |
| 4,800,766 | 1/1989 | Isozumi et al. . | |
| 4,838,100 | 6/1989 | Tanaka . | |
| 4,848,172 | 7/1989 | Morishita . | |
| 4,852,417 | 8/1989 | Tanaka . | |
| 4,852,708 | 8/1989 | Parkhurst | 192/45 |
| 4,862,027 | 8/1989 | Isozumi et al. . | |
| 4,869,354 | 9/1989 | Brazier . | |
| 4,902,904 | 2/1990 | Isozumi . | |
| 4,907,464 | 3/1990 | Isozumi . | |
| 4,912,991 | 4/1990 | Giometti . | |
| 4,918,324 | 4/1990 | Isozumi . | |
| 4,923,229 | 5/1990 | Isozumi . | |
| 4,924,108 | 5/1990 | Isozumi . | |
| 4,924,717 | 5/1990 | Aimo . | |
| 4,926,706 | 5/1990 | Isozumi . | |
| 4,941,366 | 7/1990 | Isozumi . | |
| 4,944,192 | 7/1990 | Morishita et al. . | |
| 4,945,777 | 8/1990 | Isozumi . | |
| 4,947,052 | 8/1990 | Isozumi . | |
| 4,954,733 | 9/1990 | Isozumi . | |
| 4,962,340 | 10/1990 | Isozumi . | |
| 4,963,760 | 10/1990 | Sugiyama . | |
| 4,970,908 | 11/1990 | Isozumi et al. . | |
| 4,985,637 | 1/1991 | Isozumi . | |
| 4,987,786 | 1/1991 | Morishita et al. . | |

(List continued on next page.)

FOREIGN PATENT DOCUMENTS

| | | |
|---|---|---|
| 0 384 808 | 8/1990 | European Pat. Off. . |
| 0 649 984 A1 | 4/1995 | European Pat. Off. . |
| 2 566 868 | 1/1986 | France . |
| 2 781 014 | 1/2000 | France . |
| 52-19528 | 2/1977 | Japan . |
| 01-208564 | 8/1989 | Japan . |
| 8-100749 | 4/1996 | Japan . |

*Primary Examiner*—Allan D. Herrmann

*Attorney, Agent, or Firm*—Finnegan, Henderson Farabow, Garrett & Dunner, L.L.P.

[57] ABSTRACT

A starter motor assembly is provided. A motor housing encloses an electric motor having a rotatable armature shaft. A planetary gear assembly is provided in a pinion housing, including planetary gears, a planet carrier, and a drive shaft. A pinion is engageable with the drive shaft for turning a flywheel of an engine. A non-load-bearing overrunning clutch assembly is provided, including an outer clutch piece removably fixed with respect to the pinion housing to be non-rotatable, and a rotatable inner clutch piece engaged with the planetary gears. Structure provided between the outer and inner clutch pieces allows rotation of the inner clutch piece in one direction and locks up the inner clutch piece in the other direction. When the starter motor assembly is energized, rotation of the armature shaft and planetary gears at a first rotational velocity rotates the inner clutch piece in the lockup direction. The inner clutch piece locks up, and the planetary gears race around the inner clutch piece and transmit rotation of the armature shaft to the drive shaft and the pinion to crank the engine. After the engine starts, rotation of the flywheel, drive shaft, and planetary gears at a second higher velocity rotates the inner clutch piece in the rotation direction, which absorbs the higher rotational velocity of the engine. The clutch assembly can be reversed inside the housing for use with either a clockwise-rotating motor or a counterclockwise-rotating motor.

48 Claims, 6 Drawing Sheets

U.S. PATENT DOCUMENTS

| | | |
|---|---|---|
| 4,989,467 | 2/1991 | Morishita et al. . |
| 4,989,704 | 2/1991 | Morishita et al. . |
| 4,990,874 | 2/1991 | Shiroyama . |
| 5,013,950 | 5/1991 | Isozumi . |
| 5,014,563 | 5/1991 | Isozumi . |
| 5,023,466 | 6/1991 | Isozumi . |
| 5,036,213 | 7/1991 | Isozumi . |
| 5,044,212 | 9/1991 | Isozumi et al. . |
| 5,052,235 | 10/1991 | Isozumi . |
| 5,067,357 | 11/1991 | Isozumi . |
| 5,067,598 | 11/1991 | Ritter et al. . |
| 5,076,109 | 12/1991 | Isozumi . |
| 5,081,874 | 1/1992 | Isozumi . |
| 5,081,875 | 1/1992 | Isozumi et al. . |
| 5,084,631 | 1/1992 | Shiroyama . |
| 5,086,658 | 2/1992 | Isozumi . |
| 5,097,715 | 3/1992 | Isozumi . |
| 5,099,703 | 3/1992 | Isozumi . |
| 5,105,670 | 4/1992 | Isozumi et al. . |
| 5,111,705 | 5/1992 | Isozumi . |
| 5,117,954 | 6/1992 | Iga . |
| 5,119,919 | 6/1992 | Iga . |
| 5,129,271 | 7/1992 | Isozumi et al. . |
| 5,130,586 | 7/1992 | Miyaji et al. . |
| 5,154,089 | 10/1992 | Konishi . |
| 5,154,090 | 10/1992 | Konishi . |
| 5,156,057 | 10/1992 | Isozumi . |
| 5,157,978 | 10/1992 | Morishita et al. . |
| 5,189,921 | 3/1993 | Nagashima et al. . |
| 5,195,389 | 3/1993 | Isozumi . |
| 5,196,727 | 3/1993 | Isozumi et al. . |
| 5,197,342 | 3/1993 | Nakagawa . |
| 5,199,309 | 4/1993 | Isozumi . |
| 5,208,482 | 5/1993 | Isozumi . |
| 5,234,389 | 8/1993 | Goates . |
| 5,255,644 | 10/1993 | Mills et al. . |
| 5,265,706 | 11/1993 | Iga . |
| 5,267,917 | 12/1993 | Kadotani et al. . |
| 5,291,861 | 3/1994 | Bartlett . |
| 5,323,663 | 6/1994 | Ohgi et al. . |
| 5,370,009 | 12/1994 | Isozumi . |
| 5,390,555 | 2/1995 | Gotou et al. . |
| 5,471,890 | 12/1995 | Shiga et al. . |
| 5,473,956 | 12/1995 | Murata et al. . |
| 5,485,905 | 1/1996 | Rader, III . |
| 5,511,642 | 4/1996 | Klotz et al. . |
| 5,518,093 | 5/1996 | Hartig et al. . |
| 5,549,011 | 8/1996 | Shiga et al. . |
| 5,557,976 | 9/1996 | Moribayashi et al. . |
| 5,595,272 | 1/1997 | Zhou . |
| 5,690,202 | 11/1997 | Myers . |
| 5,706,700 | 1/1998 | Takagi et al. . |
| 5,743,139 | 4/1998 | Murata . |
| 5,746,089 | 5/1998 | Morimoto . |
| 5,760,487 | 6/1998 | Kimura et al. . |

STARTER MOTOR ASSEMBLY

BACKGROUND OF THE INVENTION

1. Field of the Invention

The invention relates to a starter motor assembly for starting an engine and, more particularly, to a starter motor assembly for starting a vehicle engine, the starter motor assembly having a non-load-bearing overrunning clutch.

2. Description of the Related Art

Starter motor assemblies to assist in starting engines, such as engines in vehicles, are well known. The conventional starter motor assembly broadly includes an electrical motor and a drive mechanism. The electric motor is energized by a battery upon closing of an ignition switch. The drive mechanism transmits the torque of the electric motor to the flywheel of the engine, thereby cranking the engine until the engine starts.

In greater detail, closing of the ignition switch (typically by turning a key) energizes a solenoid. Energization of the solenoid moves a metal solenoid shaft, resulting in the closing of electrical contacts, applying current from the battery to an armature of the electric motor. The motor's armature shaft subsequently rotates at a high speed. A planetary gear assembly reduces the speed of rotation of the armature shaft, and an output shaft rotates at a reduced speed.

The output shaft typically is coupled to an inner ring of an overrunning clutch. (Alternately, if no planetary gears are provided, the armature shaft is coupled directly to the drive ring of the clutch.) In one conventional clutch, called a load-bearing overruning clutch, the inner ring fits within an outer ring, and the outer ring is coupled to one end of a drive shaft. The other end of the drive shaft is attached to a pinion, which is coupled to the engine flywheel.

Rotation of the output shaft causes the inner ring to lock in place within the outer ring. Torque is then transmitted to the outer ring, and via the outer ring to the drive shaft and the pinion, and the engine is cranked. Subsequently, when the engine begins to run, the flywheel rotates the pinion and drive shaft faster than the armature rotates. This high speed rotation unlocks the clutch shell and the drive ring. These clutch components are thereby free to rotate relative to one another. The high speed rotation is not transmitted by the drive ring back to the armature shaft.

Alternatively, in a load-bearing clutch, the output shaft may be coupled to the outer ring, and the inner ring may be coupled to the drive shaft.

Non-load bearing overruning clutches have also been explored. In these types of clutches, the planetary gear assembly may include a ring gear surrounding the planetary gears. An outer clutch ring is made integral with the ring gear, projecting axially away from the planetary gears. An inner clutch ring is provided within the inner circumference of the outer clutch ring. In one version, the inner clutch ring has been fixed to an internal bracket that also rotatably supports the drive shaft, and the outer clutch ring locks up against the inner ring, or rotates freely to absorb the high speed engine rotation. In another version, the outer ring is fixed against the housing, and the inner clutch ring is made integral with the ring gears of the planetary gear assembly.

Such starter motors assemblies can be either "biaxial" or "coaxial." These terms relate to the location of the solenoid and solenoid shaft with respect to the armature shaft. In a biaxial starter motor, the solenoid and solenoid shaft are attached to the motor casing, with the solenoid shaft spaced away from and generally parallel to the armature shaft. In a coaxial starter motor, the solenoid is typically placed in the motor casing so that the solenoid shaft is aligned with the armature shaft. The coaxial assembly is considered to be more compact and universally adaptable than the biaxial assembly.

The conventional starter motor assemblies described above suffer from several disadvantages.

In the conventional starter motor assemblies having load-bearing clutches, use of the clutch to transmit force can wear out the clutch mechanism, causing the clutch to fail completely or causing portions of the clutch to break off and cause further damage to the starter motor assembly.

There are also problems in the conventional starter motor assemblies having non-load-bearing clutches. Electric motors can rotate either clockwise or counterclockwise. However, the clutch mechanisms described above, with one clutch ring fixed to a planetary gear assembly ring gear, and another clutch ring fixed to a center bracket can only work with a motion rotating in one direction. Furthermore, the conventional starter motor assemblies include pinion housings which have integral flanges that cover the clutch components, preventing or hindering their removal. Hence, these clutch mechanisms must be manufactured separately for clockwise rotation motors and counterclockwise rotation motors. This requirement increases the cost to manufacture the clutches.

Finally, alignment of the armature shaft and the drive shaft is difficult. It is typical in conventional starter motor assemblies, due to inherent manufacturing variations, that the armature shaft and drive shaft are slightly misaligned, which can lead to excessive uneven wear of the planetary gears. Typically, in order to help with the alignment, a bracket is provided to rotatably support the drive shaft, which increases the manufacturing cost, or a "nose" is provided on the housing, which makes the starter motor assembly bulky.

SUMMARY OF THE INVENTION

The present invention was made with the intention of alleviating one or more of the shortcomings described above with conventional starter motor assemblies.

To achieve this goal, and in accordance with the purposes of the invention as embodied and described below, a starter motor assembly is provided. The assembly includes a housing. An electric motor is provided in the housing. The electric motor has a rotatable armature shaft. A planetary gear assembly is provided in the housing, including a rotatable drive shaft and a plurality of planetary gears engaged with the armature shaft. Each planetary gear is rotatable on a respective pin, with the pins being linked to the rotatable drive shaft. The drive shaft is engageable with a pinion assembly. The pinion assembly includes a pinion engageable with a flywheel of an engine. An overrunning clutch assembly is provided coaxially around the planetary gears. The clutch assembly includes a non-rotatable annular outer clutch piece removably fixed to an inner circumference of the housing, a rotatable annular inner clutch piece having an outer circumference provided proximate an inner circumference of the outer clutch piece and an inner circumference engaged with the planetary gears, and rotation control means provided between the outer clutch piece and the inner clutch piece for preventing rotation of the inner clutch piece in a first direction, and allowing rotation of the inner clutch piece in a second direction. The annular outer clutch piece is removable from the housing and its orientation in the housing can be reversed, so that the clutch can be used for a clockwise-rotating electric motor or a counterclockwise-rotating electric motor.

Rotation of the planetary gears at a first rotational velocity by the armature shaft results in the rotation control means preventing rotation of the inner clutch piece in the first direction, such that the rotation of the planetary gears is transmitted via the pins and drive shaft to the pinion assembly and to the flywheel.

Rotation of the planetary gears at a second rotational velocity by the flywheel, the pinion assembly, the drive shaft, and the pins, greater than the first rotational velocity, results in the rotation control means allowing rotation of the inner clutch piece in the second direction, such that the planetary gears rotate the inner clutch piece.

The invention further includes a solenoid assembly for selectively energizing the electric motor. The solenoid assembly can include a solenoid shaft parallel to the armature shaft (i.e., a biaxial starter motor assembly), or the solenoid assembly can be coaxial with an axis defined by the armature shaft and the drive shaft (i.e., a coaxial starter motor assembly).

The advantages of the invention will be set forth in the description below, and in part will be apparent from the description, or may be learned by practice of the invention. The advantages of the invention may be realized and obtained by the combinations set forth in the attached claims.

BRIEF DESCRIPTION OF THE DRAWINGS

The accompanying drawings, which are incorporated in and constitute a part of the specification, illustrate preferred embodiments of the invention. Together with the general description given above and the detailed description of the preferred embodiments given below, the drawings serve to explain the principles of the invention.

DESCRIPTION OF THE PREFERRED EMBODIMENTS

Figure 1:
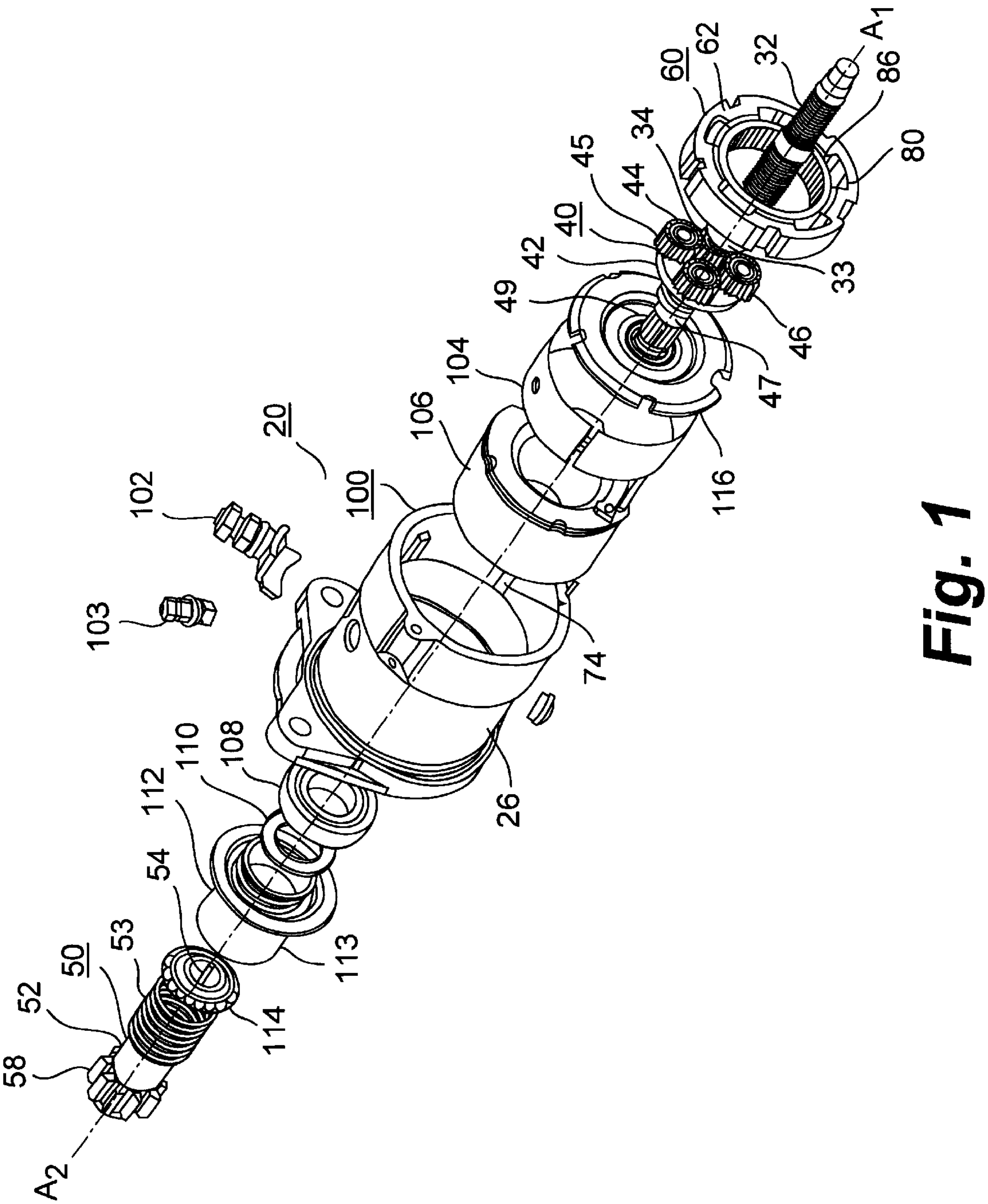
FIG. 1 is a perspective exploded part view of a preferred embodiment of a starter motor assembly according to the invention.

Reference will now be made in detail to the present preferred embodiments of the invention as broadly illustrated in the accompanying drawings.

In accordance with the invention, a starter motor assembly is provided, designated generally by reference numeral 20. As broadly embodied in FIG. 3, the starter motor assembly 20 includes a housing 22, preferably divided between a motor housing 24 and a pinion housing 26. Motor housing 24 and pinion housing 26 preferably are generally cylindrical and relatively compact in order to reduce the space required to accommodate the starter motor assembly. In addition, referring to FIGS. 1 and 2, it is preferred that pinion housing 26 be a "noseless" housing, i.e., there is no "nose" or support section projection from the forward circumference of the housing 26 to support a rotating shaft.

Figure 2:
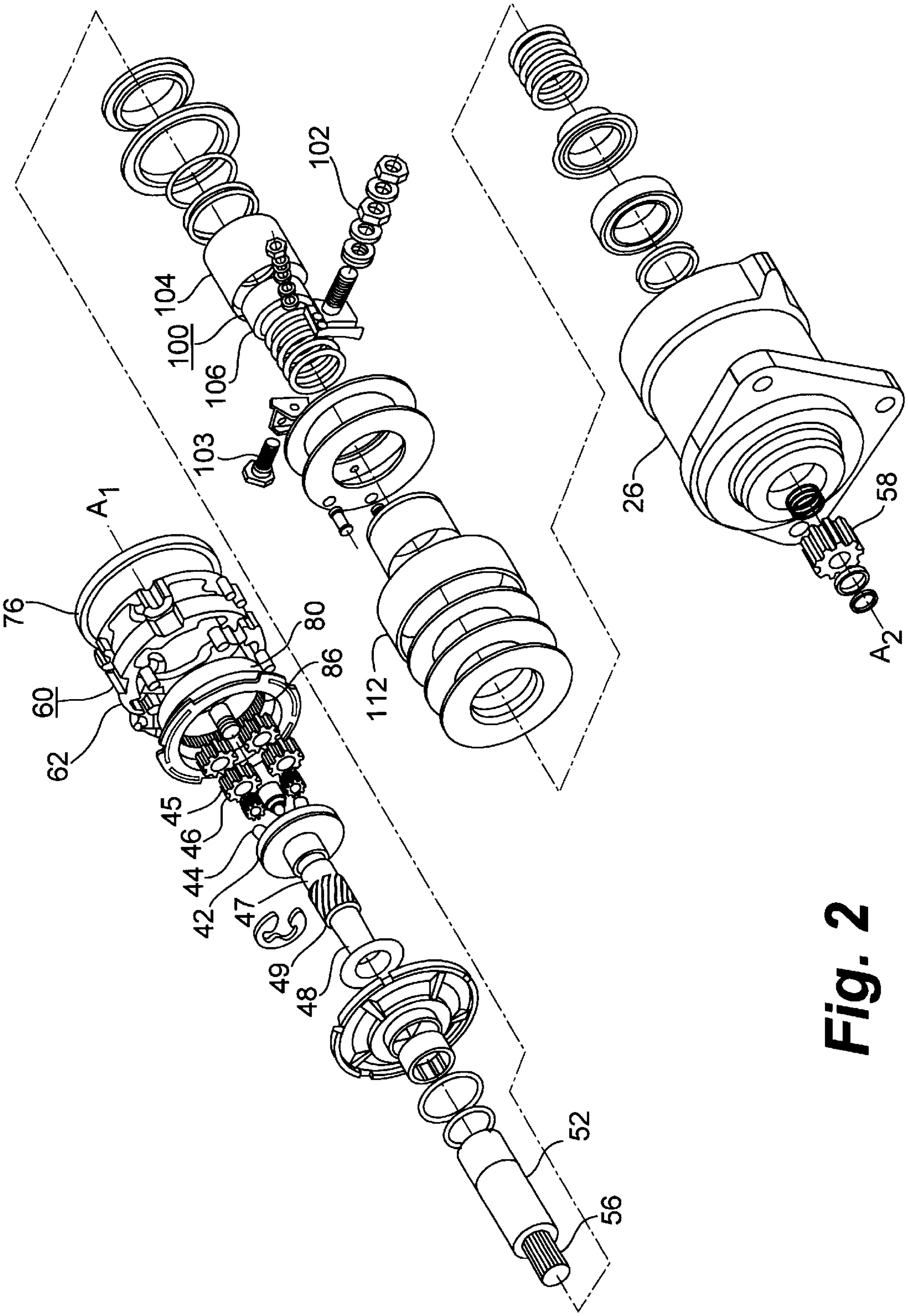
FIG. 2 is a perspective exploded part view similar to FIG. 1 but taken from a different perspective.
Figure 3:
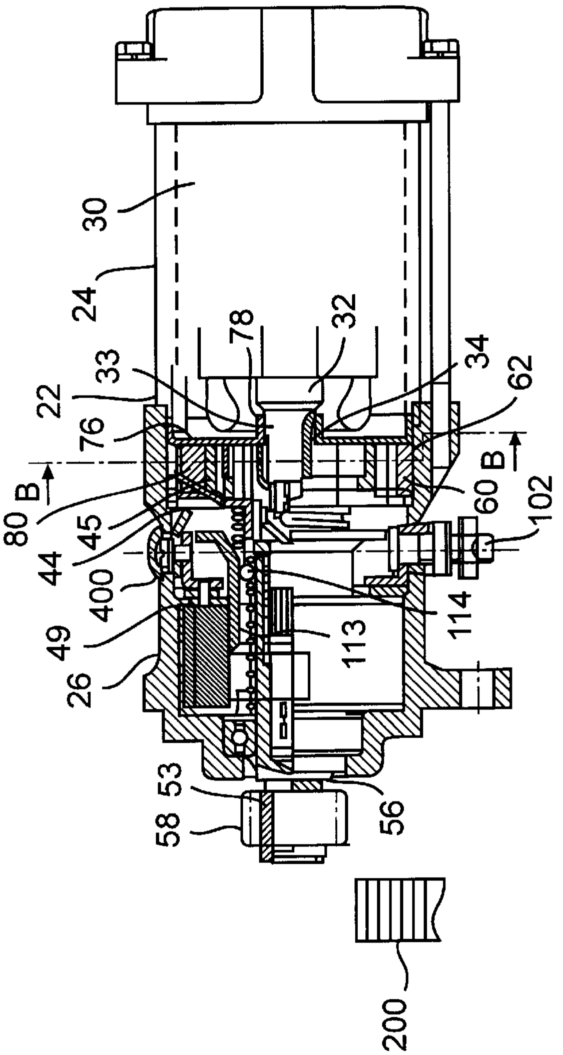
FIG. 3 is a side view, partly in cross-section, of the starter motor assembly depicted in FIGS. 1 and 2.

An electric motor is provided in the housing, having a rotatable armature shaft. As depicted in FIG. 3, an electric motor 30 (shown in relief), preferably a direct current motor, is provided in motor housing 24, with a rotating armature shaft 32 having a distal end 33 projecting out of motor housing 24. Armature shaft 32 defines an axis $A_1$–$A_2$ for the entire assembly 20 as shown in FIGS. 1 and 2. Armature shaft 32 preferably includes a plurality of splines defining a sun gear 34 provided around a circumference thereof proximate the distal end 33. It will be understood by persons skilled in the art that armature shaft 32 will rotate upon application of electrical current to the electric motor 30. It will be further understood that armature shaft 32 can rotate in either a clockwise or counterclockwise direction, depending on the specific construction of the motor. Either type of motor can be used with the invention, as explained below.

Figure 4:
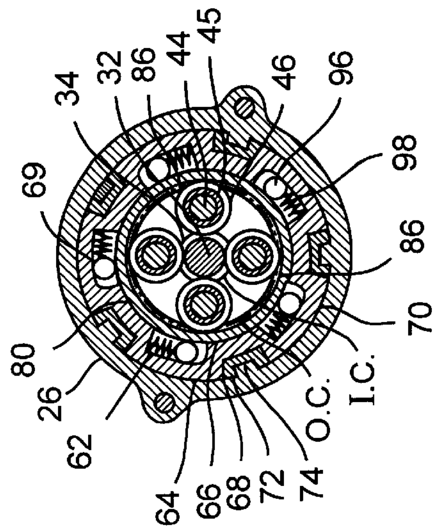
FIG. 4 is cross-sectional view of the starter motor assembly taken at B—B of FIG. 3, and depicts a clutch assembly provided with the starter motor assembly in accordance with the invention.
Figure 7:
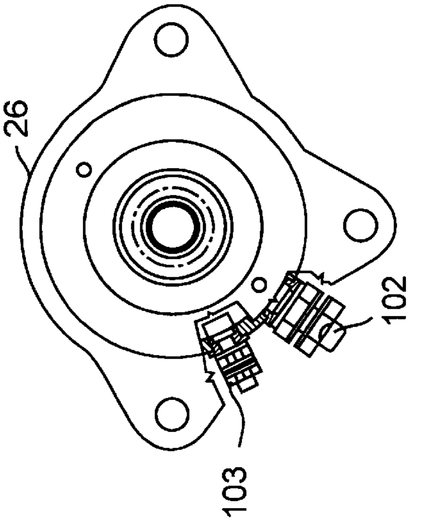
FIG. 7 is an end view of a solenoid assembly provided with the starter motor assembly depicted in FIGS. 1 and 2.

A planetary gear assembly is provided in the housing, including a drive shaft and a plurality of planetary gears engaged with the armature shaft, each planetary gear rotatable on a respective pin, the pins being linked to the rotatable drive shaft. As embodied herein, and referring to FIGS. 1, 2, and 3, a planetary gear assembly 40 is provided within pinion housing 26. A rotatable circular plate defines a planet carrier 42 and includes a plurality of pins 44 projecting from one side thereof. Each pin 44 (four are shown in the drawings but this number is not required) supports and provides an axis of rotation for a rotatable planetary gear 45. Each planetary gear 45 includes a set of splines 46 on an outer circumference thereof. As shown in FIG. 4, pins 44 and planetary gears 45 are disposed in a pattern so as to define an inner circle I.C. and an outer circle O.C. coaxially disposed around axis $A_1$–$A_2$. Armature shaft 32 projects into the center of the inner circle, and the splines of sun gear 34 on the armature shaft engage planetary gear splines 46 in the inner circle. The planetary gear assembly further includes a drive shaft 47, projecting from the side of rotatable circular plate or planet carrier 42 opposite to planetary gears 45, to be rotatable with the circular plate 42. Drive shaft 47 includes a distal end 48, with a plurality of splines 49 provided around a circumference of the drive shaft proximate its distal end 48. Drive shaft 47 is also coaxial with axis $A_1$–$A_2$.

A pinion assembly is provided in the housing engageable at one end thereof with the drive shaft, including a pinion at the other end engageable with a flywheel of an engine. As embodied herein, and referring to FIGS. 1 and 2, a pinion assembly 50 preferably includes a pinion shaft 52, having a bore with internal splines 54 at one end for engagement with splines 49 on drive shaft 47. Pinion shaft 52 preferably also has external splines 56 at the other end thereof, which engage with a pinion 58. Pinion shaft 52 also preferably includes a pinion spring 53 surrounding it. Pinion 58 projects out of pinion housing 26 for engagement with a flywheel (illustrated in FIG. 3 not engaged) of an engine (not shown) when the starter motor assembly is energized. Although the preferred embodiment shown and described includes pinion shaft 52, the invention is not limited to including this structure. It is conceivable that pinion 58 can be engaged directly with drive shaft 47, assuming that the pins 44 and/or the drive shaft 47 of the planetary gear assembly are made long enough.

Figure 5C:
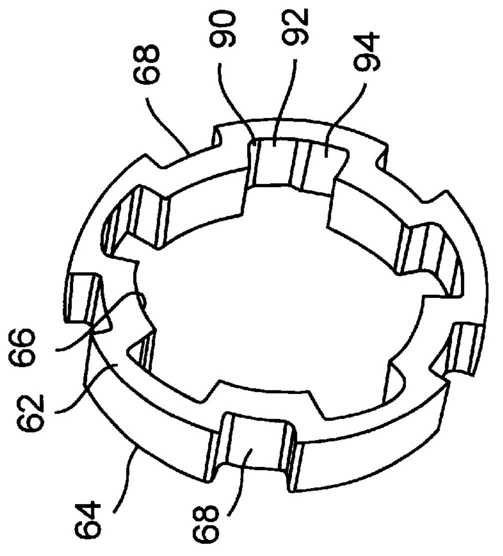
FIGS. 5A, 5B, and 5C are end, side, and perspective views, respectively, of the drive ring used in the clutch assembly depicted in FIG. 4.

An overrunning clutch assembly is provided coaxially around the planetary gears, including a non-rotatable annular outer clutch piece fixed to an inner circumference of the housing, a rotatable annular inner clutch piece having an outer circumference provided proximate an inner circumference of the outer clutch piece and an inner circumference engaged with the planetary gears, and rotation control means provided between the outer clutch piece and the inner clutch piece for preventing rotation of the inner clutch piece in a first direction and allowing rotation of the inner clutch piece in a second direction. As embodied herein, and referring to FIGS. 1, 2, and 4, clutch assembly 60 includes an annular outer clutch piece 62, preferably a drive ring. Outer clutch piece 62 is depicted in greater detail in FIGS. 5A–5C. Outer clutch piece 62 is coaxial with axis $A_1$–$A_2$, and includes an outer circumference 64 and an inner circumference 66. Outer circumference 64 includes a plurality of outer pockets 68, spaced apart from one another about outer circumference 64. Inner circumference 66 includes a plurality of inner pockets 69, spaced apart from one another about inner circumference 66.

As shown in FIG. 4, outer circumference 64 of outer clutch piece 62 contacts an inner circumference of pinion housing 26. In accordance with the invention, outer clutch piece 62 is fixed in position with respect to pinion housing 26 to be non-rotatable. It is preferred that the outer clutch piece be fixed in position in the following manner. A resilient gasket 70 is provided, having a plurality of spaced extending portions 72. Each extending portion 72 is positioned so that when gasket 70 is placed adjacent the outer circumference of outer clutch piece 62, each extending portion 72 will insert into an outer pocket 68. It is further preferred that the inner circumference of pinion housing 26 be configured with one or more axially extending ribs 74, which also extend into one or more of the outer pockets 68. Accordingly, each extending portion 72 of resilient gasket 70 compresses between a rib 74 on pinion housing 26, and an outer pocket 68 on outer clutch piece 62, thereby locking the outer clutch piece 62 in place with respect to the pinion housing 26. However, the invention is not limited to the configuration described above. For example, the ribs can be provided on the outer circumferential surface of the outer clutch piece, and the pockets can be provided on the inner circumferential surface of the housing. The resilient gasket can be a removable component, or it can be integral with the housing inner circumferential surface or the outer clutch piece outer circumferential surface. Alternately, any structure that will fix the outer clutch piece against the inner circumference of the housing is also acceptable. Finally, a disk-shaped retention plate 76, having a central annulus 78, is provided to insert into the opening of pinion housing 26 and hold all of the clutch components in place in the pinion housing.

Figure 6C:
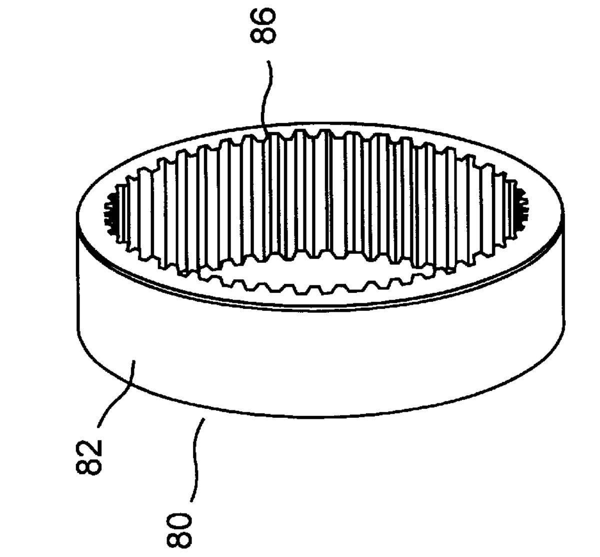
FIGS. 6A, 6B, and 6C are end, side, and perspective views, respectively, of the ring gear used in the clutch assembly depicted in FIG. 4.
Figure 6B:
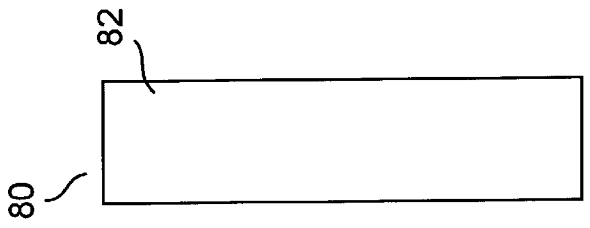
Figure 6A:
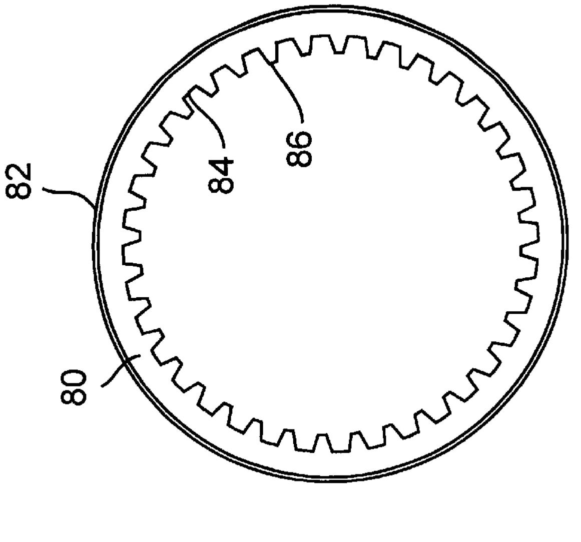

As embodied herein, and referring to FIGS. 2, 3, and 4, clutch assembly 60 also includes an inner clutch piece 80, preferably a ring gear. Inner clutch piece 80 is depicted in greater detail in FIGS. 6A–6C. Inner clutch piece 80 is coaxial with axis $A_1$–$A_2$, and includes a generally smooth outer circumference 82 and an inner circumference 84 which is configured with a plurality of axially extending splines 86. Smooth outer circumference 82 is configured to rotate with respect to the inner circumference 66 of outer clutch piece 62. Inner splines 86 are configured to engage with splines 46 of each planetary gear 45 around the outer circle O.C. defined by the planetary gears.

Figure 5B:
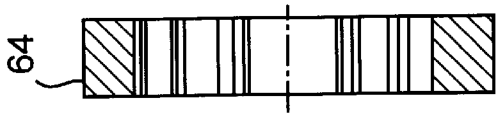
Figure 5A:
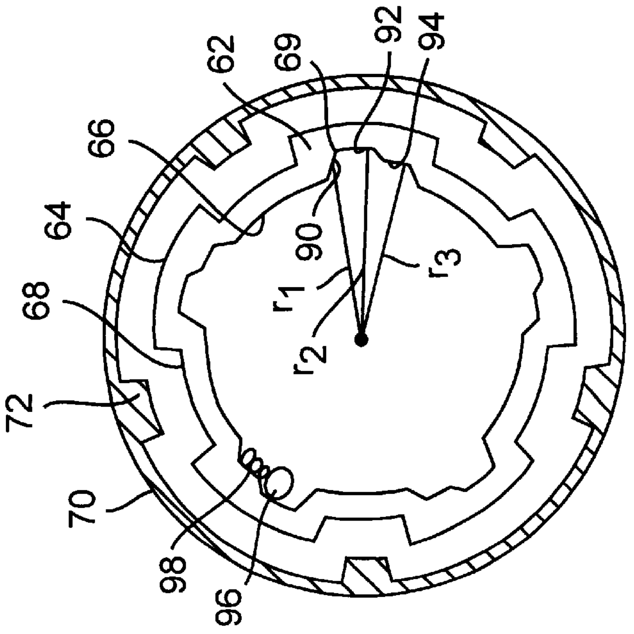

As embodied herein, and referring to FIGS. 4 and 5A–5B, rotation control means are provided to prevent rotation of the inner clutch piece in a first direction and allow rotation of the inner clutch piece in a second direction. It is preferred that each inner pocket 69 of outer clutch piece 62 includes three separate pocket portions, designated 90, 92, and 94. First pocket portion 90 has a first radial distance $r_1$ from axis $A_1$–$A_2$, second pocket portion 92 has a second radial distance $r_2$ from axis $A_1$–$A_2$ that is larger than the first radial distance $r_1$ of first pocket portion 90, and third pocket portion 94 has a third radial distance $r_3$ from axis $A_1$–$A_2$ that is smaller than the first and second radial distances of the first and second pocket portions. Axially extending roller pins 96 are provided to move between the first and second pocket portions 90, 92. Springs 98 are provided in third pocket portions 94, positioned in a circumferential orientation so as to provide a bias to roller pins 96 from the second pocket portions 92 toward the first pocket portions 90.

The function and operation of the rotation control structure described above will be understood by persons of skill in the art. Stated simply, rotation of inner clutch piece 80 in a first direction, e.g., counterclockwise in FIG. 4, will cause roller pins 96 to shift from wider second pocket portions 92 to narrower first pocket portions 90, under the bias of springs 98. Because of the smaller radii of the first pocket portions 90, roller pins 96 will be compressed between first pocket portions 90 and the outer circumference 82 of inner clutch piece 80. This compression causes inner clutch piece 80 to lock up and stop rotating in this particular direction. Conversely, rotation of inner clutch piece 80 in an opposite direction, e.g., clockwise in FIG. 4, causes roller pins 96 to move back into second pocket portions 92 against the bias of springs 98. The larger radii in second pocket portions 92 allow inner clutch piece 80 to rotate freely without interference from roller pins 96.

The invention is not limited to this particular structure of rotation control means. For example, persons of ordinary skill in the art also are familiar with sprags, i.e., elliptical shaped rollers that rock slightly to lock up and transmit torque. Sprags, or any similar structure, can also be used to selectively prevent rotation of the inner clutch piece in one direction and allow rotation in the other direction.

The clutch assembly 60 is assembled in the following manner. Motor housing 24 is removed from pinion housing 26. The components of the starter motor assembly are assembled in pinion housing 26 with the clutch assembly 60 nearly flush with the rear circumferential opening of pinion housing 26, as shown in FIGS. 3 and 4. As embodied in FIGS. 3 and 4, the opening of pinion housing 26 includes no obstruction to insertion or removal of the starter motor assembly components. The planetary gears 45 are slid into place on pins 44. The inner clutch piece 80 is slid in place around the outer circle O.C. of the planetary gears 45, and the outer clutch piece 62 is slid in place around the inner clutch piece 80, with ribs 74 on the inner circumference of the pinion housing 26 sliding into outer pockets 68 of outer clutch piece 62. Resilient gasket 70 is then inserted, with extending portions 72 inserting into outer pockets 68. Finally, disk-shaped retention plate 76 is inserted, with central aperture 78 along axis $A_1$–$A_2$ for insertion therethrough of distal end 33 of armature shaft 32.

This modular assembly makes it possible to remove and reverse the orientation of clutch assembly 60, depending on whether electric motor 30 is a clockwise-rotating motor or a counterclockwise-rotating motor. No matter which type of motor is used, the retention plate 76 and resilient gasket 70 can be removed, and the outer clutch piece can be removed, reversed 180°, and slid back into place, thereby reversing the orientation of the inner pockets and the rotation control means, so that the inner clutch piece 80 locks up in the reverse direction, and spins in the reverse direction. This reversibility is achieved because the clutch assembly 60 is completely modular, because of the structure of the clutch rings 62 and 80, and because the pinion housing 26 is open at the rear, and includes a removable retention plate 76 rather than an integral flange. The planetary gear assembly ring gear and the inner bracket of previous non-load-bearing clutches have been eliminated completely. The clutch assembly components are therefore not permanently attached to any other structure in the starter motor assembly, and removal is not obstructed. This reversibility make the clutch assembly of the invention universally adaptable, notwithstanding the direction of rotation of the electric motor.

A solenoid assembly is provided for selectively energizing the electric motor. As embodied herein, and referring to FIGS. 1, 2, 3, and 7, a solenoid assembly 100 includes a battery "B" contact 102 and an "S" contact 103 fixed to pinion housing 26. Upon closing of the ignition switch, an electrical connection (not shown) is made between battery contact 102 and the windings of electric motor 30 to energize the electric motor 30. Solenoid assembly 100 further includes a center bracket 116 an insulating plate 104, a magnetic switch 106, a bearing 108, a sealing ring 110, and a main contact assembly 112. Main contact assembly 112 includes a plunger 113 and a bearing 114. In the embodiment illustrated, energization of solenoid assembly 100 upon closing of the ignition switch also causes the solenoid assembly to operate to move pinion shaft 52 and, thus, pinion 58 in the axial direction ($A_1$–$A_2$), such that pinion 58 engages the flywheel of the engine to be started. Pinion 58 will remain engaged with the flywheel until the ignition switch is opened, at which time pinion shaft 52 and pinion 58 will be pushed by pinion spring 53 in the opposite axial direction to disengage pinion 58 from the flywheel. Plunger 113 and bearing 114 help support the drive shaft 47 and pinion shaft 52, so that no bracket or "nose" are needed on the pinion housing to support the drive shaft 47. In addition, the bearing 114 isolates plunger 113 from the shaft so the plunger 113 does not spin when the shaft turns. Opening of the ignition switch also opens the electrical connection between battery contact 102 and the windings of the electric motor 30, turning off the electric motor 30.

Figure 8:
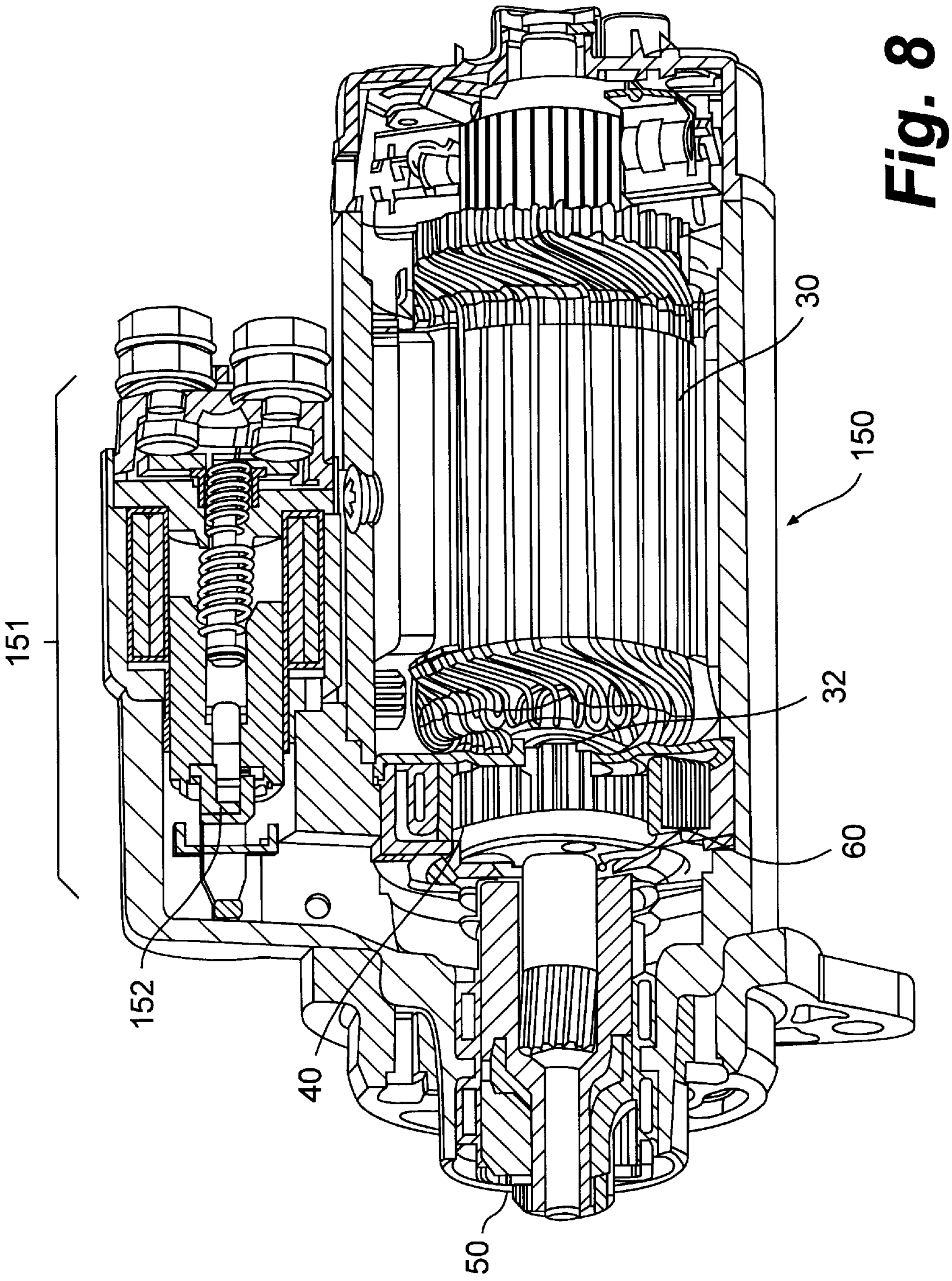
FIG. 8 is an embodiment of the invention in a biaxial-configured starter motor.

FIGS. 1 and 2 depict a coaxial starter motor in which the solenoid assembly 100 is coaxially aligned along axis $A_1$–$A_2$ with the armature shaft 32, drive shaft 47, pinion shaft 52, and pinion 58. However, the invention is not limited to use with a coaxial configuration. The invention can also be used in a biaxial configuration, in which the solenoid assembly is provided on motor casing 24, with a solenoid shaft arranged generally parallel to armature shaft 32. The biaxial starter motor assembly will be configured in accordance with the invention to include the planetary gear assembly 40 and clutch assembly 60 described above. An example of an embodiment of the invention in a biaxial-configured starter motor is illustrated in FIG. 8, in which biaxial starter motor assembly 150 includes electric motor 30, planetary gear assembly 40, clutch assembly 60, pinion assembly 50, and solenoid assembly 151 with its solenoid shaft 152 parallel to armature shaft 32 of electric motor 30.

Operation of the invention will now be described. When the ignition switch is turned to the "on" position, battery terminal 102 transmits electric current from a starter battery to energize solenoid assembly 100, which in turn energizes electric motor 30. In addition, in the coaxial starter configuration shown in FIGS. 1–3, energization of the solenoid assembly 100 biases pinion shaft 52 and pinion 58 along axis $A_1$–$A_2$ until pinion 58 engages the flywheel of the engine.

With the energization of electric motor 30, armature shaft 32 rotates (clockwise in FIGS. 3 and 4). The splines of sun gear 34 of armature shaft 32 engage splines 46 on planetary gears 45 (around the inner circle I.C. defined by the planetary gears 45), in turn causing the planetary gears to rotate on pins 44. Splines 46 of planetary gears 45 also engage splines 86 on inner circumference 84 of inner clutch piece 80 (in the outer circle O.C. defined by planetary gears 45), attempting to rotate inner clutch piece 80 in a first direction (i.e., opposite to the armature shaft, counterclockwise in FIGS. 3 and 4). However, rotation of inner clutch piece 80 in the first direction caused by rotation of armature shaft 32 causes roller pins 96 to shift from wide second pocket portions 92 to narrow first pocket portions 90, under the bias of springs 98. Compression of roller pins 96 between inner clutch piece 80 and first pocket portions 90 of fixed outer clutch piece 62 causes inner clutch piece 80 to lock up, preventing further rotation of inner clutch piece 80 in the first direction. Stress applied to the clutch assembly by the lockup is absorbed by resilient gasket 70.

Lockup of inner clutch piece 80 causes planetary gears 45 to race around the inner circumference 84 of inner clutch piece 80, and to transmit rotation of armature shaft 32 via pins 44 and circular plate or planet carrier 42 to drive shaft 47. The planetary gear assembly 40 also steps down the rotational velocity of armature shaft 32 so that drive shaft 47 rotates at a stepped down velocity, referred to as first rotational velocity $W_1$, also known as the cranking velocity or cranking speed.

Engagement of splines 49 of drive shaft 47 with inner splines 54 on pinion shaft 52 causes pinion shaft 52 and pinion 58 to rotate at the cranking speed $W_1$. Engagement of pinion 58 with the engine flywheel also rotates the engine crank shaft at the cranking speed.

Hence, power is transmitted from the electric motor via the armature shaft, the planetary gear assembly, the drive shaft, and the pinion assembly to the engine. The clutch, however, bears no load.

Once the engine starts, the flywheel rotates at a second rotational velocity $W_2$, or engine speed, which is a much higher rotational velocity than cranking speed $W_1$. Because the rotational force of the engine far exceeds that of electric motor 34, pinion 58 and pinion shaft 52 will now be driven by the engine and rotate at $W_2$, and the rotational force will be transmitted via splines 54 and 49, drive shaft 47, circular plate or planet carrier 42 and pins 44 to planetary gears 45. The planetary gears 45 will rotate at a stepped up speed that is higher than $W_2$. The planetary gears 45 will now rotate faster than sun gear 34 and armature shaft 32.

Because the starter motor assembly is being driven by the engine at a higher rotational velocity, the direction of force on inner clutch piece 80 reverses, and clutch piece 80 is rotated in a second direction (clockwise in FIG. 4), opposite to the first direction. Roller pins 96 are freed up and are pushed back into wider second pocket portions 92. Accordingly, inner clutch piece 80 is free to rotate relative to outer clutch piece 62. Therefore, in this overrunning condition, the additional speed of the engine, resulting in faster rotation of planetary gears 45, is transmitted to inner clutch piece 80 rather than to armature shaft 32. Inner clutch piece 80 rotates and absorbs the overspeed of the engine, which is therefore not transmitted back to the armature shaft.

Stress created by the change in direction of the inner clutch piece 80 is absorbed by resilient gasket 70.

The rotational velocity $W_3$ of inner clutch piece 80 is determined as follows:

$$W_3 = W_2\left(1+\frac{Z_1}{Z_3}\right)-\left(W_1\frac{Z_1}{Z_3}\right)$$

where $W_3$=inner clutch piece RPM $W_2$=engine RPM $W_1$=cranking RPM $Z_1$=planetary gear tooth number $Z_3$=inner clutch piece tooth number Once again, however, the clutch bears no load, because inner clutch piece 80 simply spins with respect to outer clutch piece 62. The overrunning clutch assembly never bears a load during operation of the starter motor assembly, giving the clutch assembly of the invention a much longer lifetime than a clutch assembly in a conventional starter motor assembly.

As discussed above, it is inconsequential to the invention whether the armature shaft 32 rotates in a clockwise or counterclockwise direction when starting the engine. Because outer clutch piece 62 is annular in shape and removably fixed to the inner circumference of the housing, and because the housing does not restrict removal of the clutch components, the clutch assembly is reversible, i.e., it can be oriented in either direction depending on the direction of rotation of the armature shaft. In other words, to change operational direction of the starter motor, the outer clutch piece 62 need only be rotated 180°.

Furthermore, flotation of the inner clutch piece 80 helps to align the drive shaft 47 properly with the armature shaft 32, which was much more difficult with the configuration of conventional starter motor assemblies. In addition, in the coaxial configuration, the solenoid assembly 100 assists in aligning the shaft, eliminating the need for a center bracket, and allowing use of a "noseless" housing, which takes up less space. A properly aligned drive shaft and armature shaft also results in less uneven wear on the planetary gears and longer assembly life.

Additional advantages and modifications will readily occur to those of ordinary skill in the art. The invention therefore is not limited to the specific details and embodiments shown and described above. Departures may be made from such details without departing from the spirit or scope of the invention. The scope of the invention is established by the claims and their legal equivalents.

We claim:

1. A starter motor assembly comprising:

a housing;

an electric motor provided in the housing having a rotatable armature shaft;

a planetary gear assembly provided in the housing including a rotatable drive shaft and a plurality of planetary gears engaged with the armature shaft, each planetary gear being rotatable on a respective pin, the pins being linked to the rotatable drive shaft;

a pinion assembly provided in the housing engageable at one end with the drive shaft, the pinion assembly including a pinion at the other end engageable with a flywheel of an engine; and an overrunning clutch assembly provided coaxially around the planetary gears, including a non-rotatable annular outer clutch piece removably fixed to an inner circumference of the housing, a rotatable annular inner clutch piece having an outer circumference provided proximate an inner circumference of the outer clutch piece and an inner circumference engaged with the planetary gears, and rotation control means provided between the outer clutch piece and the inner clutch piece for preventing rotation of the inner clutch piece in a first direction and allowing rotation of the inner clutch piece in a second direction;

wherein an orientation of the outer clutch piece in the housing is reversible.

2. The starter motor assembly of claim 1, wherein rotation of the planetary gears at a first rotational velocity by the armature shaft results in the rotation control means preventing rotation of the inner clutch piece in the first direction, such that the rotation of the planetary gears is transmitted via the pins and drive shaft to the pinion assembly and to the flywheel.

3. The starter motor assembly of claim 2, wherein rotation of the planetary gears at a second rotational velocity by the flywheel, the pinion assembly, the drive shaft, and the pins, greater than the first rotational velocity, results in the rotation control means allowing rotation of the inner clutch piece in the second direction, such that the planetary gears rotate the inner clutch piece.

4. The starter motor assembly of claim 1, wherein the housing includes a motor housing surrounding the electric motor and a pinion housing surrounding the planetary gear assembly, the overrunning clutch assembly, and a portion of the pinion assembly.

5. The starter motor assembly of claim 1, further comprising a solenoid assembly for selectively energizing the electric motor.

6. The starter motor assembly of claim 5, wherein the solenoid assembly includes a solenoid shaft substantially parallel to the armature shaft.

7. The starter motor assembly of claim 5, wherein the solenoid assembly is coaxial with the drive shaft and wherein energization of the solenoid assembly moves the pinion into engagement with the flywheel.

8. The starter motor assembly of claim 1, wherein the rotation control means includes at least one roller provided in a pocket on the inner circumference of the outer clutch piece, the pocket including a first portion having a first radial distance from the armature shaft and a second portion having a second radial distance from the armature shaft that is greater than the first radial distance.

9. The starter motor assembly of claim 8, wherein the rotation control means further includes a spring provided in a third portion of the pocket, the spring oriented to provide a bias force to the roller from the second portion of the pocket to the first portion of the pocket.

10. The starter motor assembly of claim 1, wherein the outer clutch piece is a drive ring.

11. The starter motor assembly of claim 1, wherein the inner clutch piece is a ring gear.

12. The starter motor assembly of claim 1, wherein an outer circumference of the outer clutch piece is fixed to the inner circumference of the housing with an axial spline provided on a circumferential surface of one of the outer clutch piece and the housing, projecting into a pocket provided on a circumferential surface of the other of the outer clutch piece and the housing.

13. A coaxial starter motor assembly comprising:

a housing;

an electric motor provided in the housing having a rotatable armature shaft;

a planetary gear assembly provided in the housing including a rotatable drive shaft and a plurality of planetary gears engaged with the armature shaft, each planetary gear rotatable on a respective pin, the pins being linked to the rotatable drive shaft;

a pinion assembly provided in the housing engageable at one end with the drive shaft, the pinion assembly including a pinion at the other end engageable with a flywheel of an engine;

a solenoid assembly provided in the housing coaxially about the drive shaft, wherein electric current provided to the solenoid assembly urges the pinion into engagement with the flywheel; and an overrunning clutch assembly provided coaxially around the planetary gears, including a non-rotatable annular outer clutch piece removably fixed to an inner circumference of the housing, a rotatable annular inner clutch piece having an outer circumference provided proximate an inner circumference of the outer clutch piece and an inner circumference engaged with the planetary gears, and rotation control means provided between the outer clutch piece and the inner clutch piece for preventing rotation of the inner clutch piece in a first direction and allowing rotation of the inner clutch piece in a second direction;

wherein an orientation of the outer clutch piece in the housing is reversible.

14. The starter motor assembly of claim 13, wherein rotation of the planetary gears at a first rotational velocity by the armature shaft results in the rotation control means preventing rotation of the inner clutch piece in the first direction, such that the rotation of the planetary gears is transmitted via the pins and drive shaft to the pinion assembly and to the flywheel.

15. The starter motor assembly of claim 14, wherein rotation of the planetary gears at a second rotational velocity by the flywheel, the pinion assembly, the drive shaft, and the pins, greater than the first rotational velocity, results in the rotation control means allowing rotation of the inner clutch piece in the second direction, such that the planetary gears rotate the inner clutch piece.

16. The starter motor assembly of claim 13, wherein the housing includes a motor housing surrounding the electric motor and a pinion housing surrounding the planetary gear assembly, the overrunning clutch assembly, and a portion of the pinion assembly.

17. The starter motor assembly of claim 13, wherein the rotation control means includes at least one roller provided in a pocket on the inner circumference of the outer clutch piece, the pocket including a first portion having a first radial distance from the armature shaft, and a second portion having a second radial distance from the armature shaft that is greater than the first radial distance.

18. The starter motor assembly of claim 17, wherein the rotation control means further includes a spring provided in a third portion of the pocket, the spring oriented to provide a bias force to the roller from the second portion of the pocket to the first portion of the pocket.

19. The starter motor assembly of claim 13, wherein the outer clutch piece is a drive ring.

20. The starter motor assembly of claim 13, wherein the inner clutch piece is a ring gear.

21. The starter motor assembly of claim 13, wherein an outer circumference of the outer clutch piece is fixed to the inner circumference of the housing with an axial spline provided on a circumferential surface of one of the outer clutch piece and the housing, projecting into a pocket provided on a circumferential surface of the other of the outer clutch piece and the housing.

22. A starter motor assembly comprising:

a housing;

an electric motor in the housing having an armature shaft and a means for energizing the electric motor;

a planetary gear assembly including a drive shaft and a plurality of planetary gears engageable with the armature shaft and the drive shaft;

a pinion shaft having first and second ends, the first end engaged with the drive shaft of the planetary gear assembly and the second end including a drive pinion engageable with a flywheel of an engine; and an overrunning clutch assembly including a rotatable annular ring gear and an annular drive ring provided around the ring gear and removably fixed to an inner circumference of the housing, the ring gear having a splined inner circumference engaged with the plurality of planetary gears and a smooth outer circumference, the drive ring having a smooth inner circumference, and rotation control means provided between the ring gear and the drive ring for preventing rotation of the ring gear with respect to the drive ring when the planetary gears turn at a first rotational velocity, such that the planetary gears transmit rotational force to the drive shaft, pinion shaft, and pinion, and for allowing rotation of the ring gear with respect to the drive ring when the pinion, pinion shaft, drive shaft, and planetary gears rotate at a second rotational velocity, such that the planetary gears transmit rotational force to the ring gear;

wherein an orientation of the drive ring in the housing is reversible.

23. The starter motor assembly of claim 22 wherein the control means includes at least one roller provided in at least one pocket provided in an inner circumference of the drive ring, the pocket including a first portion having a first radial distance from the armature shaft wherein the roller is compressed between the pocket and the outer circumference of the ring gear, thereby preventing rotation of the ring gear, and a second portion having a second radial distance from the armature shaft that is greater than the first radial distance, wherein the roller can rotate, thereby allowing rotation of the ring gear.

24. The starter motor assembly of claim 23, wherein the control means further includes at least one spring located in a third portion of the pocket, the spring oriented to provide a bias to the roller toward the first portion of the pocket.

25. The starter motor assembly of claim 22, wherein the housing includes a motor housing surrounding the electric motor such that the armature shaft projects out of one end of the motor housing.

26. The starter motor assembly of claim 25, wherein the housing further includes a pinion housing removably attached to the motor housing and surrounding the clutch assembly, planetary gear assembly, drive shaft, and a portion of the pinion shaft such that the second end of the pinion shaft and the pinion project out from the pinion housing.

27. The starter motor assembly of claim 22, wherein the means for energizing the electric motor includes a solenoid assembly provided in the housing coaxially surrounding the drive shaft, the solenoid being electrically connected to the electric motor.

28. The starter motor assembly of claim 22, wherein the means for energizing the electric motor includes a solenoid assembly proximate the housing having a solenoid shaft generally parallel to the armature shaft, the solenoid shaft moving upon energization of the solenoid to a contact position to provide power to the electric motor.

29. The starter motor assembly of claim 22, wherein an outer circumference of the drive ring is fixed to the inner circumference of the housing with an axial spline provided on a circumferential surface of one of the drive ring and the housing, projecting into a pocket provided on a circumferential surface of the other of the drive ring and the housing.

30. A starter motor assembly comprising:

a housing;

an electric motor provided in the housing having a rotatable armature shaft;

a planetary gear assembly provided in the housing including a rotatable drive shaft and a plurality of planetary gears engaged with the armature shaft, each planetary gear rotatable on a respective pin, the pins being linked to the rotatable drive shaft;

a pinion provided on a distal end of the drive shaft and engageable with a flywheel of an engine; and an overrunning clutch assembly provided coaxially around the planetary gears, including a non-rotatable annular outer clutch piece removably fixed to an inner circumference of the housing, a rotatable annular inner clutch piece having an outer circumference provided proximate an inner circumference of the outer clutch piece and an inner circumference engaged with the planetary gears, and rotation control means provided between the outer clutch piece and the inner clutch piece for preventing rotation of the inner clutch piece in a first direction, and allowing rotation of the inner clutch piece in a second direction;

wherein an orientation of the outer clutch piece in the housing is reversible.

31. The starter motor assembly of claim 30, wherein rotation of the planetary gears at a first rotational velocity by the armature shaft results in the rotation control means preventing rotation of the inner clutch piece in the first direction, such that the rotation of the planetary gears is transmitted via the pins and drive shaft to the pinion assembly and to the flywheel.

32. The starter motor assembly of claim 31, wherein rotation of the planetary gears at a second rotational velocity by the flywheel, the pinion, the drive shaft, and the pins, greater than the first rotational velocity, results in the rotation means allowing rotation of the inner clutch piece in the second direction, such that the planetary gears rotate the inner clutch piece.

33. The starter motor assembly of claim 30, wherein the housing includes a motor housing surrounding the electric motor and a pinion housing surrounding the planetary gear assembly and the overrunning clutch assembly.

34. The starter motor assembly of claim 30, further comprising a solenoid assembly for selectively energizing the electric motor.

35. The starter motor assembly of claim 34, wherein the solenoid assembly includes a solenoid shaft substantially parallel to the armature shaft.

36. The starter motor assembly of claim 34, wherein the solenoid assembly is coaxial with the drive shaft, and wherein energization of the solenoid assembly moves the pinion into engagement with the flywheel.

37. The starter motor assembly of claim 30, wherein the rotation control means includes at least one roller provided on a pocket in the inner circumference of the outer clutch piece, the pocket including a first portion having a first radial distance from the armature shaft, and a second portion having a second radial distance from the armature shaft that is greater than the first radial distance.

38. The starter motor assembly of claim 37, wherein the rotation control means further includes a spring provided in a third portion of the pocket, the spring oriented to provide a bias force to the roller from the second portion of the pocket to the first portion of the pocket.

39. The starter motor assembly of claim 30, wherein the outer clutch piece is a drive ring.

40. The starter motor assembly of claim 30, wherein the inner clutch piece is a ring gear.

41. The starter motor assembly of claim 30, wherein an outer circumference of the outer clutch piece is fixed to the inner circumference of the housing with an axial spline provided on a circumferential surface of one of the outer clutch piece and the housing, projecting into a pocket provided on a circumferential surface of the other of the outer clutch piece and the housing.

42. An overrunning clutch assembly for a starter motor assembly comprising:

a non-rotatable annular outer clutch piece removably fixed to an inner circumference of a generally cylindrical housing to be non-rotatable;

a rotatable annular inner clutch piece having an outer circumference provided proximate an inner circumference of the outer clutch piece and an inner circumference engageable with a driving mechanism; and rotation control means for preventing rotation of the inner clutch piece in a first direction, and allowing rotation of the inner clutch piece in a second direction;

wherein an orientation of the outer clutch piece in the housing is reversible.

43. The overrunning clutch assembly of claim 42, wherein an outer circumferential surface of the outer clutch piece is attachable to the inner circumferential surface of the housing with an axially extending rib provided on one circumferential surface extending into a pocket provided on the other circumferential surface.

44. The overrunning clutch assembly of claim 43, further comprising a resilient gasket configured to be inserted between the rib and the pocket.

45. The overrunning clutch assembly of claim 42, wherein rotation of the driving mechanism at a first rotational velocity results in the rotation control means preventing rotation of the inner clutch piece in the first direction, such that the rotation of the drive mechanism is transmitted downstream of the clutch assembly.

46. The overrunning clutch assembly of claim 45, wherein rotation of the driving mechanism at a second rotational velocity greater than the first rotational velocity results in the rotation control means allowing rotation of the inner clutch piece in the second direction, such that the difference between the second rotational velocity and the first rotational velocity is not transmitted upstream of the clutch assembly.

47. The overrunning clutch assembly of claim 42, wherein the inner circumference of the inner clutch piece is splined for engagement with splines on the drive mechanism.

48. An overrunning clutch assembly for a starter motor assembly comprising:

a non-rotatable annular outer clutch piece removably attachable to an inner circumference of a generally cylindrical housing to be non-rotatable;

a rotatable annular inner clutch piece having an outer circumference provided proximate an inner circumference of the outer clutch piece and an inner circumference engageable with a driving mechanism; and rotation control means for preventing rotation of the inner clutch piece in a first direction, and allowing rotation of the inner clutch piece in a second direction;

wherein an orientation of the outer clutch piece in the housing is reversible;

wherein an outer circumferential surface of the outer clutch piece is attachable to the inner circumferential surface of the housing with an axially extending rib provided on one circumferential surface extending into a pocket provided on the other circumferential surface; and wherein a resilient gasket is configured to be inserted and is inserted between the rib and the pocket.

* * * * *